3,660,324
PROCESS FOR PRODUCTION OF CATIONIC SYNTHETIC RUBBER LATEX

Kotaro Onchi, Yokkaichi, Japan, assignor to Japan Synthetic Rubber Co., Ltd., Tokyo, Japan
No Drawing. Filed Mar. 2, 1970, Ser. No. 15,902
Claims priority, application Japan, Mar. 8, 1969, 44/17,671
Int. Cl. C08c 7/18; C08d 7/18; C08f 47/18
U.S. Cl. 260—17.5                                  8 Claims

ABSTRACT OF THE DISCLOSURE

A cationic surfactant comprising an adduct of ethylene oxide and an alkylamine and an ampholytic surfactant or lignin derivative are added to an ordinary anionic synthetic rubber latex and the pH of the latex is maintained within a certain range of about 7.5 to 2.0; a cationic synthetic rubber latex is obtained which is not diluted with a great amount of an aqueous medium and which is excellent in dispersion stability.

---

This invention relates to a process for the production of a cationic synthetic rubber latex. More specifically, it relates to a process for converting a conventional anionic synthetic rubber latex in which synthetic rubber particles are emulsified and dispersed in an aqueous medium with an anionic surfactant, to a cationic synthetic rubber latex which has an excellent utility as adhesive, waterproof stuff, sealant and additive to asphalt and cement and the like.

Most of conventional synthetic rubber latices used as adhesives and binders are anionic latices. The bonding ability of anionic latices to various substances to be bonded is generally poor under a wet condition. Further, when adhesives are prepared from such anionic latices by incorporating fillers and other additives thereinto, in order to stabilize them it is necessary to add an anionic or non-ionic surfactant, which results inevitably in occurrence of foams, decrease of water resistance and degradation of bonding strength. Accordingly, as is well known, the use of such anionic latices is limited.

Various attempts have been made to expand the use of anionic latices by converting them to cationic latices. For instance, conversion of natural rubber latices occurred first because natural rubber contains great amounts of proteins showing amphoteric property. However, since a synthetic rubber latex is quite different from natural rubber latex in the composition and the behavior of colloidal particles, it is generally difficult to apply the method of cationizing natural rubber latices directly to synthetic rubber latices.

As the technique of preparing cationic synthetic rubber latices a process has been known for obtaining directly cationic synthetic rubber latices by polymerizing monomers with a recipe capable of giving a cationic property to the product. However, this process is still defective in that the preparation cost is high and physical properties of the product are not sufficient. There has been also known a process comprising pouring a conventional anionic synthetic rubber latex little by little under violent agitation into a relatively large amount of an acidic aqueous medium containing a cationic surfactant and dispersing synthetic rubber particles in the acidic aqueous medium in a manner such that coagulation of synthetic rubber particles will not be caused to occur. However, the cationic synthetic rubber latex prepared by this process is inevitably defective in that the product is excessively diluted with the aqueous medium and the synthetic rubber content is too low. Accordingly, in order to obtain a latex having a solid content applicable to ordinary use it is necessary to conduct a troublesome step of concentrating the resulting product. For this reason it is difficult to work this process on an industrial scale. Further, in the cationic latex prepared by this process the emulsion dispersibility of the synthetic rubber particles is relatively poor and the phase separation of the latex is easily caused to occur.

It has been found that when a certain cationic surfactant and a certain ampholytic surfactant or lignin derivative are added to an ordinary anionic synthetic rubber latex and the pH of the latex is maintained within a certain range, there can easily and advantageously be obtained a cationic synthetic rubber latex which is not diluted with a great amount of an aqueous medium and which is excellent in dispersion stability.

In accordance with this invention a process is provided for the preparation of cationic synthetic rubber latices which comprises incorporating (A) a cationic surfactant composed of an adduct of ethylene oxide and an alkylamine and (B) an ampholytic surfactant containing an anionic carboxyl group and a quaternary nitrogen atom or a lignin derivative having a surface-activating property into an anionic synthetic rubber latex in which synthetic rubber particles are emulsified and dispersed in an aqueous medium with an emulsifier containing an anionic surfactant, adding an acid to the resulting latex composition and thereby adjusting the pH of the aqueous system to about 7.5 to about 2.0.

Any of known anionic synthetic rubber latices can be used in this invention. For instance, latices of synthetic rubbers such as polybutadiene, polyisoprene, butyl rubber, styrene-butadiene rubber (SBR), acrylo-nitrile-butadiene rubber (NBR), chloroprene rubber, ethylene-propylene rubber (EPR) and ethylene-propylene-non-conjugated diene rubber (EPTR) are optionally used in this invention. For improving the adhesion property of these synthetic rubber latices, for instance, SBR latex and NBR latex by introducing carboxyl groups thereinto, they are copolymerized with an ethylenically unsaturated carboxylic acid. In this invention latices of these modified synthetic rubbers may be also used as starting material.

In addition to commercially available synthetic rubber latices, it is possible to use as material latex a so-called "strip latex" which is the cheapest latex and is in the as-obtained state by polymerizing monomers in an aqueous medium containing an anionic surfactant as emulsifier. Even when such cheap latex is used as starting material, this invention can provide a cationic synthetic rubber latex prominently excellent in the bonding ability. Some of synthetic rubber latices such as EPR latex are prepared by dispersing an organic solvent solution of a synthetic rubber obtained by solution polymerization, into an aqueous medium together with an anionic surfactant and then removing the organic solvent. Such latices are also usable in this invention.

The solid content of an anionic synthetic rubber latex to be used is not critical in this invention. For instance, a concentrated synthetic rubber latex having such a high solid content as 70 percent by weight may be used in this invention. Further, in this invention, since the cationizing treatment is effected without a substantial lowering of the solid content, a low concentration latex having such a low solid content as 20 percent by weight may be used without any disadvantages. Thus, the process of this invention may be generally applied to anionic synthetic rubber latices having a solid content ranging from 20 percent by weight to 70 percent by weight.

In these anionic synthetic rubber latices, synthetic rubber particles are emulsified and dispersed in an aqueous medium with an anionic surfactant such as fatty acid soap, rosin acid soap, resin acid soap, sodium alkylbenzenesulfonate and sodium alkylsulfate, or a combination of such anionic surfactant with a non-ionic surfactant such as polyoxyethylene alkyl ethers, polyoxyethylene alkyl aryl ethers and polyoxyethylene polyoxypropylene block copolymers. Average particle size of the synthetic rubber particles in the latex is not particularly critical in this invention, but the average particle size of the synthetic rubber is generally in the range of from $0.05\mu$ to $0.6\mu$. The amount of the surfactant contained in the anionic synthetic rubber latex is within a range such as adopted in ordinary synthetic rubber latices, for instance in the range of from 3 percent by weight to 8 percent by weight based on the rubber solids in the latex.

In accordance with this invention, (A) a cationic surfactant composed of an adduct of ethylene oxide and an alkylamine and (B) an ampholytic surfactant containing an anionic carboxyl group and a quaternary nitrogen atom or a lignin derivative having a surface-activating property are incorporated in the above-mentioned anionic synthetic rubber latex.

Examples of the cationic surfactant are compounds expressed by the following general formula

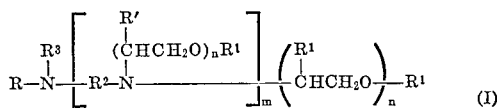

wherein R stands for an alkyl group of 6 to 22 carbon atoms, $R^1$ stands for hydrogen or methyl, $n$ is a number of 1 to 30 in total, $R^2$ stands for an alkylene group having 1 to 4 carbon atoms, $m$ is 0, 1 or 2, and $R^3$ stands for hydrogen or a group

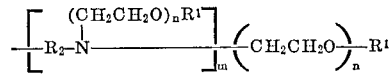

Among compounds expressed by the above formula, the compounds having the following formula are used particularly advantageously in this invention:

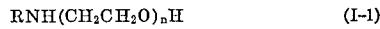           (I-1)

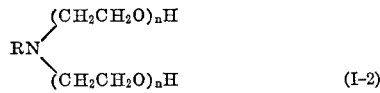           (I-2)

or

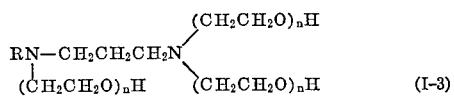           (I-3)

wherein $n$ or the sum of $n$ is usually about 4 to about 15 and R is an alkyl group of about 6 to about 22 carbon atoms.

The above-mentioned cationic surfactant reacts with an organic acid released from an anionic surfactant by the subsequent decomposition step with an acid, while causing no coagulation.

In addition to the above-mentioned compounds, alkylamine derivatives of the following formula exhibiting similar functions may be also employed in the process of this invention:

$$RCONHCH_2CH_2NH(CH_2CH_2O)_nH$$

wherein R is an alkyl group having 6 to 22 carbon atoms and $n$ is a number of 5 to 25.

As the ampholytic surfactant to be used in combination with the above-mentioned cationic surfactant, there may be used any compound as long as it contains an anionic carboxylic group and a quaternary nitrogen atom.

As such ampholytic surfactant, imidazoline type compounds of the following formula

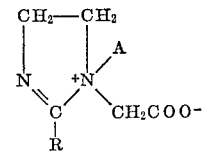

wherein R is an aliphatic hydrocarbon radical of 10 to 18 carbon atoms, such as a long chain alkyl group, e.g. decyl, dodecyl, myristyl, palmityl and stearyl, and A is a $\beta$-hydroxyethyl or lower alkyl group of 1 to 3 carbon atoms, and betaine type compounds of the following formula

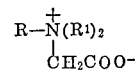

wherein R is an aliphatic hydrocarbon radical of 10 to 18 carbon atoms, such as a long chain alkyl group, e.g. dodecyl, myristyl, palmityl and stearyl, and $R^1$ is a carboxymethyl group or a lower alkyl group of 1 to 3 carbon atoms, are used advantageously in this invention.

Instead of the above-mentioned ampholytic surfactant lignin derivatives having a surface-activating property may be used in this invention. Lignin derivatives having a surface-activating property are known compounds. For instance, ammonium, sodium and potassium salts of lignin sulfonic acid, ammonium, sodium and potassium salts of thiolignin, and condensation products of a primary or secondary amine salt of thiolignin with formaldehyde are advantageously used in this invention.

In accordance with this invention, both the above-mentioned ampholytic surfactant and lignin derivatives may be used singly or in combination.

The cationic surfactant composed of an adduct of ethylene oxide and an alkylamine is added in an amount of 1 to 8 percent by weight, preferably 3 to 6 percent by weight, based on the rubber solids of the anionic synthetic rubber latex. The ampholytic surfactant or lignin derivative is added in amount of 0.5 to 7 percent by weight, preferably 2 to 5 percent by weight, based on the rubber solids in the anionic synthetic rubber latex.

One of the characteristic features of this invention resides in that an adduct of ethylene oxide and an alkylamine is added in combination with an ampholytic surfactant and/or a lignin derivative. As is well known, it is impossible to introduce cationic surfactants directly into an anionic rubber latex for cationizing the latex. Even when the introduction of the cationic surfactants is effected after the anionic surfactant has been decomposed, an organic acid released by the decomposition of the anionic surfactant reacts with a functional group of the cationic surfactant, the cationic surfactant loses its activity and accordingly, useless precipitates are formed. In order to avoid this disadvantage, this invention selects a cationic surfactant composed of an adduct of ethylene oxide and an alkylamine as a cationic surface active agent which does not cause coagulation upon reacting with the organic acid released by decomposition of the anionic surfactant. Since ordinary cationic surfactants such as trimethyl ammonium chloride, octadecylamine acetate and polyamide resin react with the above-mentioned free organic acid and are deactivated, these surfactants cannot be used in this invention.

When a cationic surfactant only is added in an anionic synthetic rubber latex, when the cationizing treatment is conducted on an industrial scale, the resulting emulsion is poor in stability and is likely to block and coagulate. However, the above-mentioned ampholytic surfactant or lignin derivative to be used in this invention can stabilize the latex during the cationizing treatment where the latex is transferred from the alkaline side to the acidic side via the neutral stage, and it acts as a cation after the latex has been made acidic, and makes up for a relatively weak cationic activity of the above-mentioned cationic surfactant to be used in this invention.

The anionic synthetic rubber latex to be used in this invention generally has a pH of 9–11, but when the above-mentioned combination of the surfactants is added to the latex, the resulting emulsion is homogeneous and very stable.

In accordance with this invention, the latex to which has been added the above-mentioned combination of the surfactants is incorporated with an acid to adjust its pH to about 7.5 to about 2.0. The reason for acidifying the latex to have a pH of about 7.5 to about 2.0 is that the cationic surface active agent exerts its function at a pH of less than about 7.5. In case materials to be bonded are easily damaged by acidity, the latex of a higher pH is used. In case the latex is used as an additive to a certain kind of an asphalt emulsion having a pH of, for instance about 2.0, good results are obtained by adjusting the pH of the latex to be similar to that of the asphalt emulsion. As the acid for adjusting the pH of the latex there may be advantageously used mineral acids such as hydrochloric acid and sulfuric acid, and organic acids such as formic acid and acetic acid.

When an acid such as hydrochloric acid is added to the synthetic rubber latex to which has been added the above-mentioned combination of the surfactants and the pH of the latex is lowered, a sharp increase of the viscosity is observed at a pH of about 8, and then the viscosity is gradually lowered in proportion to the degree of the acidification. In this invention this viscosity peak is very characteristic. When the latex whose pH has been lowered to about 4 is made alkaline again by addition of caustic soda or the like, a sharp peak of the viscosity is observed again at a pH of about 8. The pH value at which the viscosity peak is observed slightly changes depending on the kind of the anionic surfactant contained in the starting latex or the kind and amount of the nonionic surfactant added, but the viscosity generally varies on a substantially identical locus.

At a pH lower than the pH exhibiting the viscosity peak the latex of this invention shows a definite cationic property. The pH of the latex is varied depending on the intended use of the latex. For instance, when the latex is admixed into an asphalt emulsion, the pH is adjusted between about 5 and about 2. On the other hand, when it is incorporated into a portland cement or the like, the pH is adjusted to about 7.5.

Since hydrochloric acid of a concentration higher than 10 percent is applicable on an industrial scale for the acidification and even a small amount of the acid gives a sufficient result, in the process of this invention it is unnecessary to conduct the step of concentrating the resulting latex, which is indispensable in the conventional method. For instance, a cationic latex prepared from an anionic latex of a concentration of 69 percent has a concentration of 63 percent.

Accordingly, by this invention a novel cationic synthetic rubber latex is provided in which synthetic rubber particles are emulsified and dispersed in an aqueous medium with (i) 1 to 8 percent by weight, based on the rubber solids, of a cationic surfactant composed of an adduct of ethylene oxide and an alkylamine, and (ii) 0.5 to 7 percent by weight, based on the rubber solids, of an ampholytic surfactant containing an anionic carboxylic group and a quaternary nitrogen atom or a lignin derivative having a surface-activating property and in which the pH of the latex is in the range of about 7.5 to about 2.0 and the rubber solids in the latex is usually in the range of 15 to 65 percent by weight.

The so obtained cationic synthetic rubber latex of this invention is very stable and its emulsion state is not changed at all. Therefore, it makes various meritorious contributions to the art. For instance, the cationic synthetic rubber latex prepared from a cheap strip latex can exhibit a similar or superior bonding ability to that of the modified latex prepared by introducing a carboxylic radical into SBR or NBR latices for improving its bonding ability.

The modification of the cationic property of the latices, which is required in the application fields, is attained in this invention by means of controlling or adjusting the quality and quantity of the cationic or ampholytic surfactants to be added before the conversion. However, further modification of the cationic property of the product latices may be accomplished by adding thereto a secondary surfactant after the conversion. Suitable examples of such second surfactant are as follows:

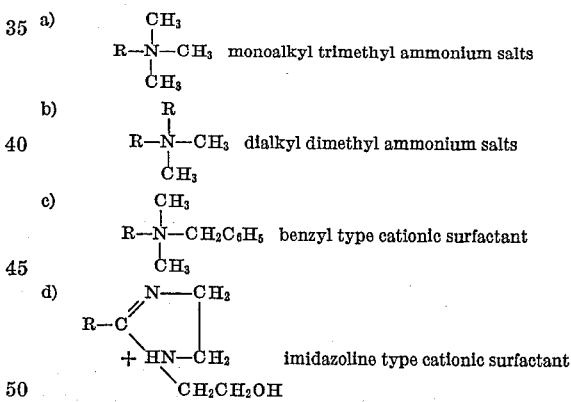

Effects of the cationic SBR according to this invention and the conventional anionic latex in various applications are shown in Table I below.

TABLE 1

| Application | Cationic SBR latex according to the present invention | Conventional anionic SBR latex |
|---|---|---|
| (1) Compounding with cationic asphalt emulsion (adhesive, waterproof coating, road pavement and sealant). | It is possible to compound the latex freely. The physical properties are improved quantitatively in proportion to the amount of the latex. Bonding strength, water resistance, heat resistance and crack resistance are particularly improved. | Any practical utility cannot be expected. |
| (2) Compounding with asphalt emulsion and cement (adhesive, caulking and waterproof stuff). | The compounding may be effected at an optional compounding ratio. Similar effects to those mentioned in (1) can be attained. | Do. |
| (3) Compounding with polyvinyl acetate emulsion. | Characteristic properties of both components are manifested coincidentally, and an excellent blend can be obtained. | Since an alkali is generally added to the polyvinyl acetate emulsion, effects attained by blending are not so prominent. |
| (4) Compounding with fillers or other additives (adhesive). | The product exhibits an excellent bonding ability to cement shaped articles, metals, synthetic fibers, etc. and is excellent in water resistance. | The product is inferior in water resistance and bonding ability. |
| (5) Compounding with cement (mortar, concrete, waterproof coating and adhesive). | A latex of butadiene/styrene ratio of a broad range can be compounded with various cements, and a cement/rubber mixture of excellent operability and good bonding ability to cement shaped articles and metals can be obtained. | In case great amounts of non-ionic surfactant and antifoaming agents are incorporated in a latex in which a ratio of styrene to butadiene is high, a product applicable to the practical use can be obtained but its operability is poor and the separation of the latex component from the cement paste is easily caused to occur. |

This invention will be now explained by referring to examples, but it is not limited by these examples.

EXAMPLE 1

Styrene-butadiene rubber latex (JSR No. 0561, product of Japan Synthetic Rubber Co., butadiene/styrene ratio=75/25, emulsifier=fatty acid soap, solid content=69%, pH=10) is blended with 1.5% of an alkylbetaine type ampholytic surfactant (Amorgen No. 15, product of Daiichi Kogyo Seiyaku K.K.,

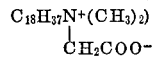

and 2% of an adduct of ethylene oxide to an alkylamine of the formula

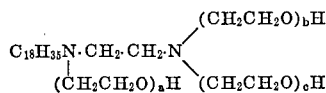

$(a+b+c=12)$.

The resulting composition is a homogeneous emulsion. Then an aqueous solution of a 10% hydrochloric acid is gradually added thereto. At a pH of 8 the viscosity of the emulsion increases sharply, but with further addition of hydrochloric acid the viscosity decreases. Thus, a cationic latex having a pH of 2–5 and a solid content of about 65% is obtained.

EXAMPLE 2

A strip latex in use for the prepartion of styrene-butadiene dry rubber (strip latex for the preparation of JSR 1500 dry SBR, butadiene/styrene ratio=77/23, emulsifier=rosin acid soap, solid content=22%) is blended with 1.8% of an alkylimidazoline type ampholytic surfactant (Amorgen No. 8, product of Daiichi Kogyo Seiyaku K.K.,

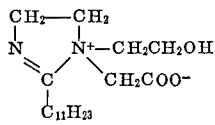

and 1.5% of an adduct of ethylene oxide and an alkylamine

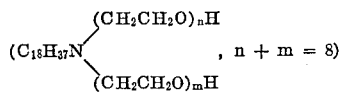

To the mixture a 30% acetic acid solution is added to obtain a cationic latex having a pH of 6 and a solid content of about 20%.

EXAMPLE 3

When in Example 1 any of the following lignin derivatives is used instead of the alkylbetaine type ampholytic surfactant, similar results are obtained:

(i) 3% of a condensate of an amine salt of thiolignin (Indulin, product of West Virginia Pulp Co., obtained by condensing primary and secondary amine salts of thiolignin with formaldehyde).
(ii) 5% of sodium ligninsulfonate, and
(iii) 6% of an ammonium salt of thiolignin.

EXAMPLE A

The SBR latex of a pH of 2 (solid content of 65%) obtained in Example 1 is blended with a cationic asphalt emulsion (asphalt content of 60% and pH of 2) in a proportion such that the rubber corresponds to 30% of the asphalt based on the solids. In this blending the compounding ratio may be freely changed depending on the desired property of the product. This blend is advantageously used as waterproof coating and road paving material. Further, when it is blended with clay and other additives to raise the pH to 6.5, an adhesive suitable for polyvinyl chloride flooring tile and the like is obtained. The blend obtained in this example is named "Composition A."

EXAMPLE B

The cationic latex of a pH of 6 obtained in Example 2 is incorporated into a cement mortar composition. Although the latex is usually added in a proportion such that the ratio of the rubber to the cement based on the solids is 10–15%, in order to obtain a composition excellent in elasticity and other properties inherent to the rubber, it is possible to heighten the ratio of the rubber component to 20–40% by using a cationic latex of a high concentration. To promote the hardening of the cement, it is also possible to incorporate into the composition a small amount of calcium chloride. Still further, in order to improve the mix-kneading operability, it is possible to add a non-ionic surface active agent of a high HLB value. As the cement component, either portland cement or alumina cement is usable. The composition obtained in this example is named "Composition B."

In case the above composition is admixed with a concrete composition, various effects are obtained. Particularly, a cement paste obtained by mixing the cement and the latex alone without using sand is very suitable as waterproof coating.

In case the composition B is admixed with the composition A at a suitable mixing ratio, for instance, a composition A-to-composition B ratio of more than 0.3 in the use requiring a high rubbery elasticity or a composition A-to-composition B ratio of less than 0.2 in the use requiring hardness rather than elasticity, there are obtained compositions suitable as rapidly-hardenable caulking material and waterproof layer-forming material.

EXAMPLE C

A filler such as clay, a viscosity-increasing agent such as methyl cellulose, and other additives are incorporated into a vehicle of the cationic SBR latex obtained in Example 1 or a cationic NBR latex obtained in the similar manner to Example 1 from a strip latex in use for the preparation of NBR dry rubber, and the pH of the resulting composition is adjusted to 6–6.5. In case the preparation of an adhesive for textile fabric packings is intended, the solid content of the composition is adjusted to 50–60% and the viscosity to 10,000–20,000 cps. In case the preparation of an adhesive for interior finish work is intended a tackifying agent such as petroleum resin is incorporated into the composition and the solid content is adjusted to 70–80% and the viscosity to 50,000–150,000 cps.

Although the above-mentioned embodiments of preparing adhesives are very limited ones, it is possible to product various adhesives suitable for the use in various fields by employing as bases various kinds of cationic synthetic rubber latices prepared according to this invention and adopting various recipes depending on the intended use.

What I claim is:

1. A process for the preparation of cationic synthetic rubber latices which comprises incorporating (a) a cationic surfactant composed of an adduct of ethylene oxide and an alkylamine and (b) an ampholytic surfactant containing an anionic carboxylic group and a quaternary nitrogen atom or a lignin derivative having a surface-activating property selected from the group consisting of alkali metal and ammonium salts of lignin sulfonic acid, alkali metal and ammonium salts of thiolignin, and condensation products of an amine salt of thiolignin with formaldehyde into an anionic synthetic rubber latex wherein the rubber is selected from diene rubbers and ethylene-propylene polymer rubbers in which synthetic rubber particles are emulsified and dispersed in an aqueous medium with an emulsifier containing an anionic surfactant, adding an acid to the resulting latex composition and thereby adjusting the pH of the aqueous system to about 7.5 to 2.0.

2. The process of claim 1 wherein said ampholytic surfactant containing an anionic carboxylic group and a quaternary nitrogen atom is a member selected from the group consisting of imidazoline type compounds of the formula

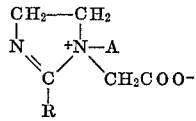

wherein R is an aliphatic hydrocarbon radical of 10 to 18 carbon atoms, and A is a β-hydroxyethyl or lower alkyl group of 1 to 5 carbon atoms, and betaine type compounds of the formula

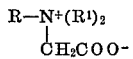

wherein R is an aliphatic hydrocarbon radical of 10 to 18 carbon atoms, and $R^1$ is a carboxymethyl group or a lower alkyl group of 1 to 3 carbon atoms.

3. The process of claim 1 wherein said acid is a member selected from the group consisting of mineral acids and organic acids.

4. The process of claim 1 wherein said cationic surfactant is a compound of the formula $$RNH(CH_2CH_2O)_nH$$

wherein R is an alkyl group having 6 to 22 carbon atoms, and $n$ is a number of 5 to 25.

5. The process of claim 1 wherein said cationic surfactant is a compound of the formula

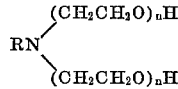

wherein R is an alkyl group having 6 to 22 carbon atoms, and the sum of $n$ is 4 to 15.

6. The process of claim 1 wherein said cationic surfactant is a compound of the formula

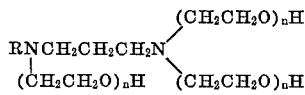

wherein R is an alkyl group having 6 to 22 carbon atoms, and the sum of $n$ is 4 to 15.

7. A cationic synthetic rubber latex in which synthetic rubber particles wherein the rubber is selected from diene rubbers and ethylene-propylene polymer rubbers are emulsified and dispersed in an aqueous medium with (i) 1 to 8 percent by weight, based on the rubber solids, of a cationic surfactant composed of an adduct of ethylene oxide and an alkylamine, and (ii) 0.5 to 7 percent by weight, based on the rubber solids, of an ampholytic surfactant containing an anionic carboxylic group and a quaternary nitrogen atom or lignin derivative having a surface-activating property selected from the group consisting of alkali metal and ammonium salts of lignin sulfonic acid, alkali metal and ammonium salts of thiolignin, and condensation products of an amine salt of thiolignin with formaldehyde, the pH of the latex being within the range of about 7.5 to about 2.0.

8. The process of claim 1 wherein said cationic surfactant is a compound of the formula

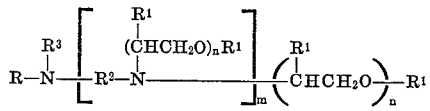

wherein R is an alkyl group having 6 to 22 carbon atoms, $R^1$ is a member selected from the group consisting of hydrogen and methyl, $n$ is a number of 1 to 30 in total, $R^2$ is an alkylene group having 2 to 3 carbon atoms, $m$ is a number of 0 or 1, and $R^3$ is a member selected from the group consisting of hydrogen and

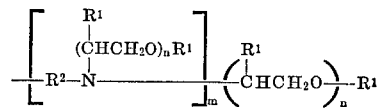

References Cited

UNITED STATES PATENTS

| | | | |
|---|---|---|---|
| 2,138,226 | 11/1938 | Dales et al. | 260—29.7 |
| 2,263,322 | 11/1941 | Walker et al. | 260—29.7 |
| 2,488,149 | 11/1949 | Vanderbilt et al. | 260—83.1 |
| 2,533,632 | 12/1950 | Salvesen et al. | 260—17.5 |
| 2,684,954 | 7/1954 | Miller | 260—29.7 |
| 3,097,179 | 7/1963 | Ceintrey | 260—28.5 |
| 3,284,388 | 11/1966 | Stierli | 260—23.7 |

FOREIGN PATENTS

| | | | |
|---|---|---|---|
| 531,195 | 12/1940 | Great Britain | 260—29.7 |

WILLIAM SHORT, Primary Examiner

E. A. NIELSEN, Assistant Examiner

U.S. Cl. X.R.

260—29.6 MN, 29.7 N